March 24, 1964     C. W. BURBACK     3,125,822
FISH LURES
Filed Aug. 26, 1960
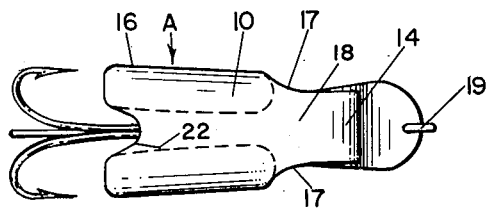
FIG. 1.
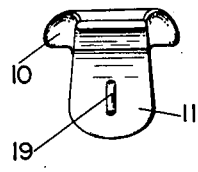
FIG. 2.
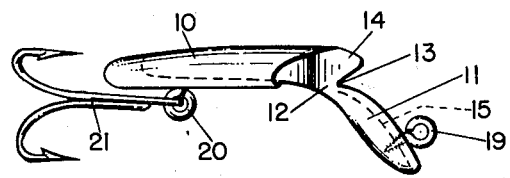
FIG 3
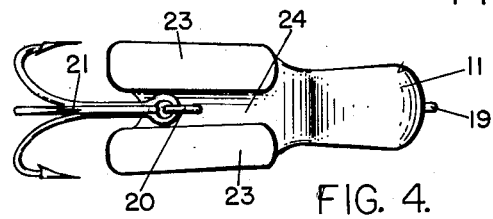
FIG. 4.
FIG 8
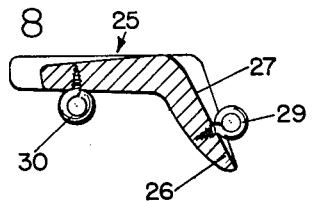
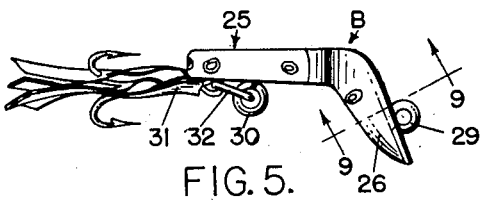
FIG. 5.
FIG. 9.
FIG. 7.
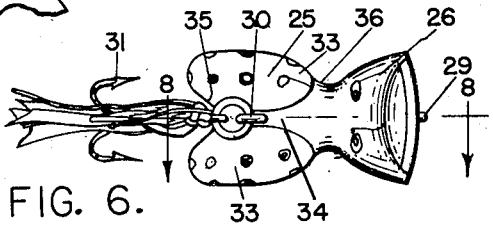
FIG. 6.
INVENTOR
Charles W. Burback
BY *Robert M. Dunning*
ATTORNEY

United States Patent Office 3,125,822
Patented Mar. 24, 1964

3,125,822
FISH LURES
Charles W. Burback, 318 S. Exchange, St. Paul 2, Minn.
Filed Aug. 26, 1960, Ser. No. 52,119
1 Claim. (Cl. 43—42.48)

This invention relates to an improvement in fish lures and deals particularly with a lure having a very pronounced action when drawn through the water.

Many types of lures for catching fish have been produced and patented, each having their own individual characteristics. Some lures have a tendency to travel in a zig-zag path through the water, and others have a tendency to vary in depth when drawn through the water. It is an object of the present invention to provide a lure which not only tends to move from side to side, but also tends to travel upwardly and downwardly as it is moved in the water.

A feature of the present invention resides in the provision of an angular lure including a body portion having a forward end portion which is inclined at an obtuse angle to the body portion. A hook is suspended from the body portion near the rear end thereof. An eye is provided on the angularly extended forward end portion intermediate the ends thereof. This eye is designed for attachment to a fishing line.

A further feature of the present invention resides in the provision of an angularly extending front end portion which is concave in cross section, with the eye centrally located with respect thereto. The concave forward end has a tendency to cause the lure to follow a zig-zag path as viewed from above. Due to the fact that the attachment of the fishing line is materially out of line with the plane of the body portion, and due to the angle of the forward portion of the lure as compared to the body portion, there is a tendency for the lure to angle in the water as it is drawn by the line. This causes the rear end of the body portion to swing downwardly. However, when the rear end of the body of the lure moves downwardly, it creates a tendency to raise the rear end of the lure, thus causing the lure to travel a zig-zag path when viewed from the side.

A further feature of the present invention resides in the provision of a lure which has a tendency to rock both laterally and vertically as it is drawn through the water. As a result, an unusual action takes place, causing the lure to have a very life like movement to attract the fish.

These and other objects and novel features of the present invention will be more clearly and fully set forth in the following specification and claims.

In the drawings forming a part of the specification:

FIGURE 1 is a top plan view of a lure showing the general arrangement of parts therein.

FIGURE 2 is a front elevational view of the lure illustrated in FIGURE 1.

FIGURE 3 is a side elevational view of the lure shown in FIGURES 1 and 2.

FIGURE 4 is a bottom plan view of the lure.

FIGURE 5 is a side elevational view of a modified form of lure.

FIGURE 6 is a bottom plan view of the lure illustrated in FIGURE 5.

FIGURE 7 is a front elevational view of the modified form of lure.

FIGURE 8 is a longitudinal sectional view through the body of the lure, the position of the section being indicated by the line 8—8 of FIGURE 6.

FIGURE 9 is a cross sectional view through the forward part of the lure, the position of the section being indicated by the line 9—9 of FIGURE 5.

The lure A illustrated in FIGURES 1 to 4 of the drawings comprises an elongated body portion 10 having a downwardly and forwardly inclined forward end portion 11. The front end portion 11 is secured to the body portion 10 along an area 12 which is spaced somewhat from the forward end of the body. As a result a generally V-shaped notch 13 is formed beneath the forward end 14 of the body portion 10 and the downwardly inclined portion 11. The forward surface of the inclined portion 11 is preferably concave in cross section, as is indicated by the dotted line 15 in FIGURE 3, alternatively, this inclined portion 11 can be flat, as the notch 13 has a tendency to cause the lure to travel in an uneven path in the water.

The edges of the body portion 10 of the lure are rounded as indicated at 16. The forward portion 14 of the lure is preferably reduced in width as illustrated in FIGURE 1, and is connected to the remainder of the body portion by rounded shoulders such as 17, forming a neck portion 18 narrower than said body. A screw eye or eye bolt 19 extends forwardly from the inclined forward portion 11, the eye 19 being located considerably below the body portion 10 when this body portion is held horizontally. A screw eye or eye bolt 20 also extends downwardly from the body portion 10, this eye being preferably about two-thirds of the length of the body portion from the front end thereof. The eye 20 is designed to support a suitable treble hook 21 or other hook structure.

As indicated in FIGURES 1 and 4 of the drawings, the body 10 is provided with a rear end which is centrally notched as indicated at 22 so that the sides of the body are somewhat longer than the central portion thereof. Substantially flat elongated side portions 23 are provided on opposite sides of the center. The center portion of the under surface of the body 10 is longitudinally grooved as indicated at 24, and the eye 20 is positioned in the center of the groove.

As the lure A moves through the water, the water strikes the inclined forward end 11 of the lure and is directed into the notch 13 from which it must escape either on one side of the notch or the other. In actual practice, the water tends to escape from one end of the notch and then the other, as the escape of the water from one end of the notch tends to force the body portion angularly in one direction creating a drag on that side of the lure which tends to twist the body in the opposite direction to permit the escape of fluid on the other side of the notch. Furthermore, as the water is guided into the notch 13, the force of the water tends to swing the rear end of the body 10 downwardly. This action continues until the under surface of the body is exposed to the water sufficiently to swing the rear end of the body upwardly to some extent. As a result, there is a constant tendency for the rear end of the body to move upwardly and downwardly, it being understood that as the lure swings about the eye 19 in a counter clockwise direction as viewed in FIGURE 3, the forward end 11 engages the water at a lesser angle, thereby decreasing the force tending to twist the lure in this direction, and also at the same time the under surface of the body becomes more exposed to the force of water.

The lure B illustrated in FIGURES 5 through 9 of the drawings is quite similar to the lure A, but does not include the notch 13. In the arrangement illustrated in these figures, the lure body is indicated in general by the numeral 25 and includes at its forward end an angularly inclined forward portion 26. As in the previous construction described, the forward end portion 26 extends at an obtuse angle to the body portion. The forward surface of the forward portion 26 is concave in cross section as indicated at 27. An eye 29 projects forwardly from the transverse center of the concave portion 27 and is designed for engagement with a fishing line. The eye 29 is substantially below the plane of the body portion 25 when the body portion is held horizontally as indicated in FIGURES 5 and 8 of the drawings. A second screw eye or eye bolt 30 projects downwardly from the body portion 25 at a point adjoining the rear end of the body portion. A hook structure is attached to the eye 30 by a suitable ring 32 or other connecting means. As indicated in FIGURE 6 of the drawings, the bottom of the body portion includes two generally flat side areas 33 which are separated by a centrally extending groove 34 in which the eye 30 is located. The rear end of the body portion 25 is centrally notched as indicated at 35.

The operation of the lure B is quite similar to the operation of the lure A. Due to the fact that the eye 29 to which the line is attached is well below the plane of the body portion 25, and due to the concave surface 27 of the forward end portion 26, the body tends to wabble laterally as well as vertically. In the lure B, as in the lure A, the forward portion 26 is somewhat wider than the portion 36 of the body immediately to the rear of the forward end of the lure.

In accordance with the patent statutes, I have described the principles of construction and operation of my improvement in fish lures, and while I have endeavored to set forth the best embodiment thereof, I desire to have it understood that changes may be made within the scope of the following claims without departing from the spirit of my invention.

I claim:

A fishing lure including, a generally flat one piece body portion which is widest near its rear extremity and which tapers slightly inwardly and forwardly, the undersurface of said body including a central longitudinal groove defined between a pair of elongated side portions having substantially flat under surfaces, a neck portion which is narrower than said body portion connected to the forward end of said body portion thereof and terminating in a forward end which is approximately the same width as the neck portion, an angular forward portion extending at an obtuse angle to said flat body portion and which is wider than said neck portion and integrally connected thereto rearwardly of said forward end of said neck portion, a line attaching means on the forward surface of said angular forward portion, and hook means attached to the undersurface of the body portion near the rear end thereof.

References Cited in the file of this patent

UNITED STATES PATENTS

| | | |
|---|---|---|
| 1,663,080 | Heddon | Mar. 20, 1928 |
| 1,908,537 | Pflueger | May 9, 1933 |
| 2,495,021 | Pruden | Jan. 17, 1950 |
| 2,512,913 | Boice | June 27, 1950 |
| 2,711,609 | Bailey | June 28, 1955 |
| 2,933,846 | Garner | Apr. 26, 1960 |